United States Patent [19]
DeRosa, Jr. et al.

[11] Patent Number: 5,822,565
[45] Date of Patent: *Oct. 13, 1998

[54] METHOD AND APPARATUS FOR CONFIGURING A COMPUTER SYSTEM

[75] Inventors: John Anthony DeRosa, Jr.; Benn Lee Schreiber, both of Bellevue, Wash.; Peter Chapman Hayden, Mont Vernon, N.H.; Scott Wade Apgar, Boxboro, Mass.

[73] Assignee: Digital Equipment Corporation, Maynard, Mass.

[*] Notice: The term of this patent shall not extend beyond the expiration date of Pat. No. 5,713,009.

[21] Appl. No.: 908,143

[22] Filed: Aug. 6, 1997

Related U.S. Application Data

[63] Continuation of Ser. No. 525,107, Sep. 8, 1995, Pat. No. 5,713,009.

[51] Int. Cl.⁶ .................................................. G06F 15/177
[52] U.S. Cl. ...................... 395/500; 395/651; 395/653; 395/670; 395/674
[58] Field of Search ...................... 395/500, 700, 395/800, 20; 364/200

[56] References Cited

U.S. PATENT DOCUMENTS

| | | | |
|---|---|---|---|
| 4,589,063 | 5/1986 | Shah et al. | 364/200 |
| 5,161,102 | 11/1992 | Griffin et al. | 395/800 |
| 5,257,387 | 10/1993 | Richek et al. | 395/800 |
| 5,263,148 | 11/1993 | Jones, Jr. et al. | 395/500 |
| 5,353,432 | 10/1994 | Richek et al. | 395/500 |
| 5,450,570 | 9/1995 | Richek et al. | 395/500 |
| 5,515,524 | 5/1996 | Lynch et al. | 395/500 |
| 5,537,596 | 7/1996 | Yu et al. | 395/700 |
| 5,586,219 | 12/1996 | Yufik | 395/20 |

*Primary Examiner*—Kevin J. Teska
*Assistant Examiner*—Russell W. Frejd
*Attorney, Agent, or Firm*—Anne E. Saturnelli

[57] ABSTRACT

A method and apparatus for configuring a computer system is presented. Underlying system software communicates information to a configuration utility. The information identifies a particular operating system that executes in the computer system. Using this information, the configuration utility formulates configuration filenames and retrieves data from the configuration files describing system resources, system device requirements, and operating system constraints. The configuration utility performs the system configuration by allocating system resources to system devices in accordance with the operating system constraints and system device requirements.

23 Claims, 6 Drawing Sheets

METHOD AND APPARATUS FOR CONFIGURING A COMPUTER SYSTEM

This is a continuation of application Ser. No. 08/525,107, filed Sep. 8, 1995, now U.S. Pat. No. 5,713,009.

BACKGROUND OF THE INVENTION

This invention relates generally to computer systems, and more particularly to configuring computer system resources.

As it is known in the art, a computer system generally includes system resources available for use, and system devices which may use the system resources. Generally, an operating system executes in the computer system providing an environment for efficiently using the system resources and the system devices. System resources include, for example, direct memory access (DMA) channels, sections of system memory, and interrupt lines or signals. System devices include, for example, a device on an input/output (I/O) bus.

For a computer system to function properly, it is generally necessary to configure the computer system. This is typically done by examining the system resources available for use and resource requirements of system devices. Resource allocation of the system resources among the system devices is performed in accordance with constraints of both the operating system and the system devices.

One technique for configuring a computer system includes executing a configuration utility to perform resource allocation prior to booting an operating system in the computer system.

One way in which the configuration utility may obtain resource requirements of a system device is through reading a configuration file associated with a specific system device. The configuration file generally describes resource requirements of the system device and any available options in granting its resource requirements. Usually, a device vendor supplies a generic version of the configuration file which can be modified in accordance with a computer system and an operating system.

One technique used to obtain the configuration file corresponding to a system device includes the configuration utility mapping a unique identifier that denotes a system device to a corresponding configuration filename. The unique identifier is typically stored in a special location, such as a device register or a hardwired circuit on a component card, associated with a system device. The configuration utility retrieves the contents of the special location containing the unique identifier specifying the system device, maps the unique identifier to the corresponding configuration filename, and retrieves the contents of the configuration file.

By retrieving the unique identifier of each system device and the contents of a corresponding configuration file, the configuration utility obtains the resource requirements of the system devices in a computer system. Similarly, the configuration utility obtains information describing the system resources available for use by reading a system identifier, for example, from a special location on a central processing unit (CPU) board, determining a corresponding system configuration file, and retrieving the contents of the corresponding system configuration file describing the system resources available for allocation to the system devices.

The configuration utility obtains the resource requirements of system devices, and the system resources available. In addition, the configuration utility obtains the added constraints imposed by the operating system. Thus, the configuration utility allocates the system resources accordingly among the system devices.

Generally, besides considering system device requirements, the configuration utility needs to account for additional factors, such as additional constraints, requirements, and additional system resources, that affect resource allocation. While the configuration utility can adequately acquire the hardware or system device constraints and the resources available for use, inadequate techniques are typically used to acquire and incorporate additional factors, such as operating system constraints imposed by one of several different operating systems that execute in the computer system.

Currently, acquiring and incorporating the additional constraints, such as those associated with an operating system, during system configuration may be handled using several different techniques.

One technique includes an interactive dialogue between the configuration utility and a user manually entering appropriate responses in accordance with cumbersome release notes or other documentation for each device detailing the operating system constraints. This technique has several drawbacks. Data entry is typically performed by manually entering data using an input device, such as a keyboard. It involves a time consuming and cumbersome task of reading detailed written documentation and entering appropriate responses. Additionally, this data entry process is typically repeated each time the computer system needs to be reconfigured due to an addition or modification of a system device, or upon booting a different operating system in the computer system.

A second technique used to incorporate operating system constraints includes a computer system vendor supplying one set of configuration files for each operating system supported by that computer system vendor for a particular hardware platform or model. Each set of operating system specific configuration files are premodified to properly reflect operating system constraints. Typically, each set is placed on a single computer disk or floppy and includes one file per device supported by the computer system vendor.

This second technique has several drawbacks. There are added manufacturing costs for computer system vendors associated with providing multiple disks, one for each operating system supported by the computer system vendor. Additionally, the number of disks may increase further if the computer vendor has several different hardware models or platforms for each operating system, each platform requiring a different configuration file for an operating system.

Another drawback with this second technique is the additional costs of maintaining and updating the numerous files on the multiple computer disks. Product reliability and quality may decrease since both maintaining the numerous configuration files on multiple computer disks, and also requiring the user to use a correct operating system disk for a particular operating system increase the chance for human error. The latter may result in additional vendor support costs due to increased customer problems and complaints.

A third technique used to incorporate the operating system constraints includes modifying the configuration utility so that a portion of the operating system constraints or dependencies are embedded within the configuration utility in accordance with operating systems and devices supported by a particular vendor. Difficulties arise since the configuration utility is typically owned and maintained by independent vendor other than the computer system vendor. The computer system vendor usually has no control over the content and development of the configuration utility.

Using this third approach, the configuration utility is typically modified by the independent vendor or the computer system vendor to incorporate the necessary modifications per operating system in the configuration utility incurring added costs and complications. The former alternative generally incurs added costs and increased reliance upon the independent vendor to incorporate modifications correctly and as needed. The latter alternative typically incurs additional costs including development and maintenance costs. It is desirable to minimize dependencies on the configuration utility since computer system vendors may frequently add support for new devices requiring additional modifications to the configuration utility. Embedding changes within the configuration utility creates an undesirable dependency since the computer vendor does not typically own and maintain the configuration utility. Such a dependency may delay and complicate added support for new devices, in addition to increasing costs.

SUMMARY OF THE INVENTION

In accordance with the present invention is an apparatus comprising a means for obtaining computer specific information and a configuration utility. The means for obtaining computer specific information includes a means for producing a file identifier corresponding to a configuration file by using input parameter values comprising a portion of the computer specific information. The configuration utility configures the computer system by performing resource allocation using configuration data from a configuration file. The filename of the configuration file is constructed, using the file identifier, by a filename constructing means included in the configuration utility.

Further, in accordance with the invention is a method for configuring a computer system. The method includes the steps of obtaining computer system specific information and producing a file identifier using input parameters describing a portion of the computer specific information. The file identifier is transmitted to a configuration utility which constructs a filename corresponding to a configuration file containing configuration data used by the configuration utility to allocate system resources.

With such an arrangement, a computer system may be configured in a cost and time efficient manner without adversely incurring additional costs and simultaneously increasing quality and system reliability. The arrangement is flexible so that a computer system vendor may optimally customize underlying system software and a configuration utility by applying one of a wide range of different variations. Additionally, with such an arrangement, a computer system vendor may minimize external dependencies by implementing functions subject to modifications in the firmware program which is under the control of the computer system vendor. Modifications may be performed efficiently with a minimal amount of associated cost and time and without imposing undue restrictions on a computer system vendor and customer, such as encumber the computer system vendor with additional costs and dependencies and require a customer to wait for additional device support.

BRIEF DESCRIPTION OF THE DRAWINGS

The above-mentioned and other features of the invention will become more apparent by reference to the following description taken in connection with the accompanying drawings in which.

DETAILED DESCRIPTION OF PREFERRED EMBODIMENTS

Figure 1:
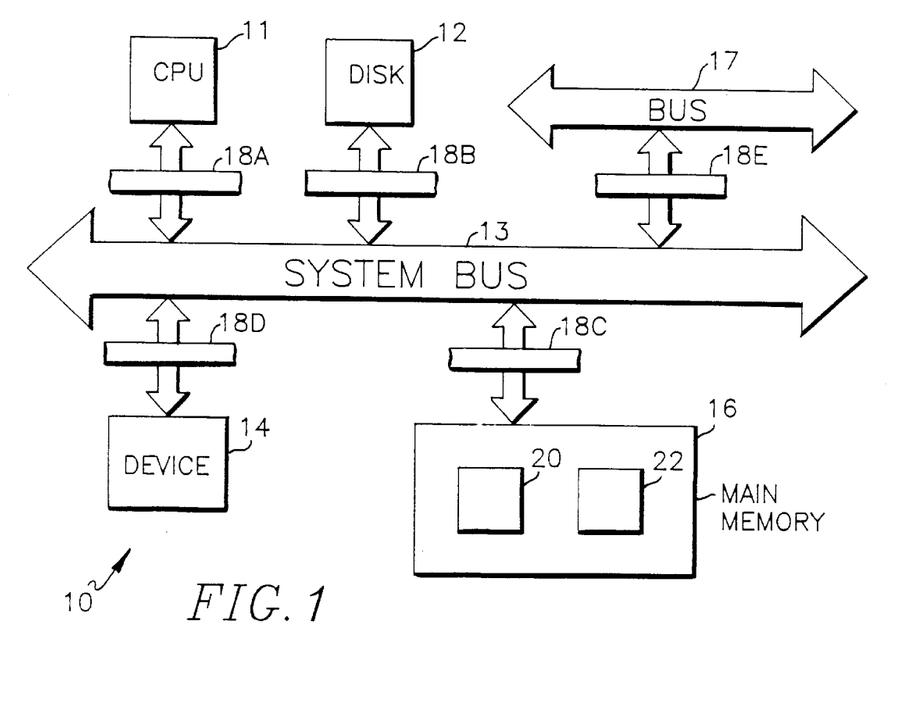
FIG. 1 is a simplified computer system.

Referring now to FIG. 1, a computer system 10 is shown to include a central processing unit (CPU) 11, a computer disk drive 12, a system bus (first bus) 13, another system device 14 (which may be an input device, such as a keyboard connected to a terminal), and a main memory 16 each interconnected by system bus 13 via bus interfaces 18a–18d. A second bus 17, which may be an I/O bus or another system bus, is also connected to the system bus 13 via bus interface 18e. The CPU, disk drive, other system device, second bus and main memory communicate over the system bus 13. Machine executable programs, such as a configuration utility 20 and underlying system software 22 are loaded in the main memory 16 for execution by the CPU. A machine executable program typically contains machine instructions to be executed by the CPU which reads in the machine executable program from memory over the bus and executes the machine instructions. A configuration utility 20 is generally a machine executable program comprising machine instructions that are loaded into memory, for example, from a computer disk using the disk drive 12. The underlying system software 22 is generally a machine executable program loaded into memory for execution during computer system startup prior to booting a particular operating system. Both the configuration utility and the underlying system software will be discussed in greater detail below.

Generally, performing resource allocation for a computer system includes configuring bus interfaces, such as bus interfaces 18a–18e coupled to system bus 13 of FIG. 1, in accordance with system devices, system resources and operating system constraints. For example, a system device on an I/O bus may require a particular address space in memory or certain DMA channels. The operating system may impose further constraints, such as require reservation of a portion of system address space beginning at a particular address, or not accommodate interrupt sharing among multiple system devices.

Typically, the configuration utility is used to configure the devices on the system bus. The configuration utility is usually a machine executable program stored on a computer disk and produced by compiling source code with a compiler producing object files which are linked with a linker producing the configuration utility machine executable program. The source files typically contain source statements written in a programming language, such as "C", or an assembly language.

A computer system vendor usually licenses and distribute a machine executable copy of the configuration utility which is typically owned and maintained by an independent vendor other than the computer system vendor.

The configuration utility is generally executed when a computer system, as depicted in FIG. 1, needs to be initially configured or reconfigured. The computer system is initially configured and then reconfigured when there is a modification to the computer system which may affect system resource allocation. A modification includes, for example, when a different operating system is booted, when there is a modification to the computer system resources, such as the addition of a system device, or when there is a change in the allocation of system address space.

Generally, the configuration utility is initially executed to determine resource allocation information which is saved in non-volatile memory. Upon rebooting the computer system, the saved resource allocation information is read from the non-volatile memory. The configuration utility is subsequently re-executed upon a change in system configuration, such as the addition of a new system device, to reconfigure the computer system. Typically, the configuration utility is capable of executing with minimal underlying system software generally stored as firmware in read-only memory (ROM).

Due to the limited functionality provided by the underlying system software, the machine executable code comprising the underlying system software is generally much less than the machine executable code comprising a typical operating system. The underlying system software also has control of the computer system prior to booting similar to the control an operating system may have subsequent to booting the computer system.

A preferred implementation embodying the invention will now be described which automates computer system configuration by modifying the configuration utility and the underlying system software to include information dependent on operating system constraints. Generally, a preferred implementation embodying the invention incorporates or embeds a portion of the operating system constraint information within the underlying system software to minimize the amount of operating system dependent information embedded within the configuration utility for efficiency and cost effectiveness.

Figure 2:
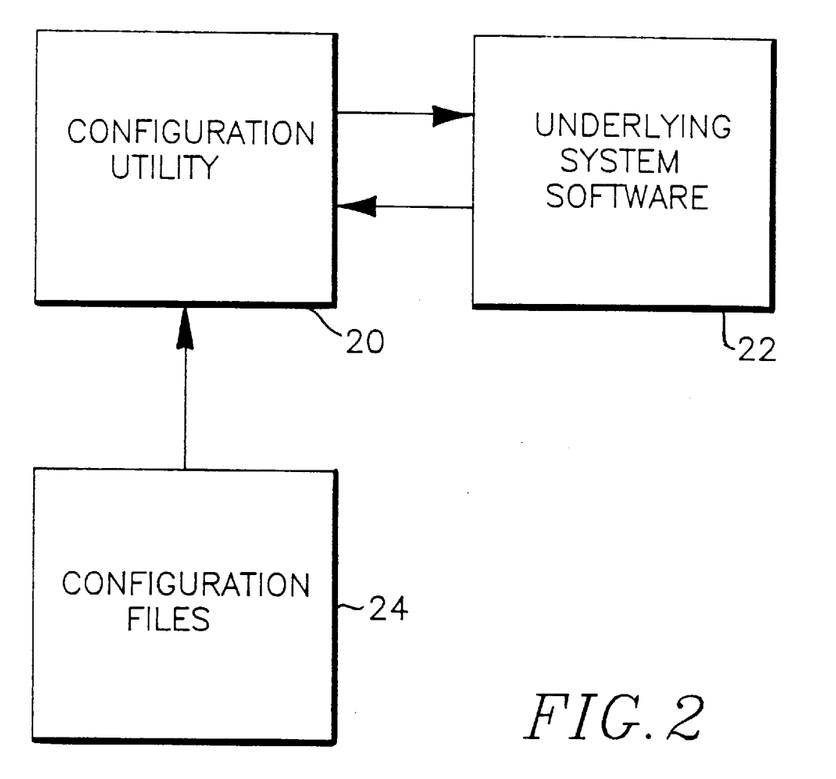
FIG. 2 depicts the configuration utility and underlying system software interaction.

Referring now to FIG. 2, the configuration utility 20 and underlying system software 22 are typically loaded into main memory when a system configuration is performed. When the underlying system software is executed in the computer system, it provides information to the configuration utility 20 enabling the configuration utility to identify a particular operating system. The configuration utility determines the configuration files 24 needed for the particular operating system identified by the underlying system software.

Figure 3:
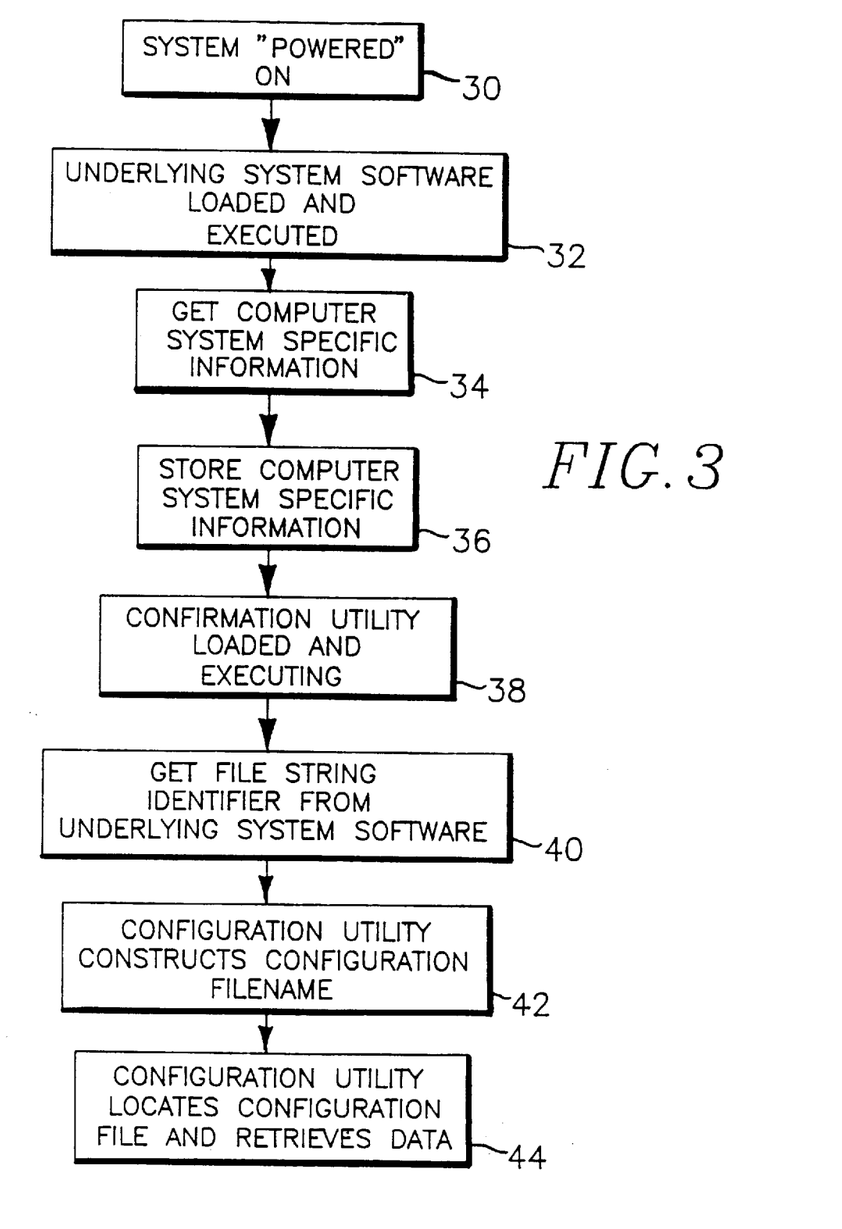
FIG. 3 is a flowchart outlining steps for obtaining a configuration file.

Referring now to FIG. 3, the particular method steps for obtaining configuration files of the preferred implementation of FIG. 2 are shown. Initially when a computer system is "powered" on (at step 30), the underlying system software is loaded (at step 32) into memory and executed. An operator may interact with the underlying system software, for example, using a keyboard, to obtain (at step 34) computer system specific information including identifying the particular operating system used in the computer system. The underlying system software stores (at step 36) the computer system specific information in non-volatile memory for subsequent use, such as when rebooting an operating system or when executing the configuration utility. Typically, the configuration utility is loaded (at step 38) into memory for execution during system configuration, as in FIG. 2. The configuration utility interacts (at step 40) with the underlying system software to obtain a string identifier incorporating a portion of the computer system specific information previously stored in non-volatile memory, such as the particular operating system which may be subsequently executed. The configuration utility constructs (at step 42) a configuration filename using the string identifier. The configuration utility may also use other information, such as a device identifier corresponding to a system device or a system identifier corresponding to the particular computer system CPU board, to construct the configuration filename. The configuration utility locates and obtains (at step 44) data from the configuration files needed to properly configure the computer system. The configuration utility configures the computer system using the configuration data and produces resource allocation results describing which system resources have been allocated to which system devices.

A device identifier is typically an alphanumeric string comprising two (2) concatenated portions—a computer system vendor identifier and a device number. Generally, a computer system vendor supports various devices in a computer system that includes a bus, such as an Extended Industry Standard Architecture (EISA) bus. A computer system vendor is usually assigned a vendor identifier, such as vendor identifier "DEC" for Digital Equipment Corporation, typically by registering with a designated group that allocates vendor identifiers. The vendor further assigns a specific digit sequence to each particular device supported in the vendor's computer system. Similarly, a system identifier is typically an alphanumeric string including the vendor identifier and a computer system model number designating a particular hardware model of the computer system.

Typically, the resource allocation results may be stored in non-volatile memory for subsequent use, for example, during rebooting the computer system. The configuration utility may directly store the results in non-volatile memory or the results may be communicated to the underlying system software which, in turn, stores the configuration results.

Information or configuration data contained in configuration files may be obtained from configuration files stored on a computer disk. The configuration data read by the configuration utility may also be stored in memory, such as non-volatile memory.

The configuration files may exist on one or more computer disks or "floppies" in an organization that facilitates search and retrieval of configuration information by the configuration utility. There are many possible organizations for the configuration files which depends on the number and type of specific files, the file directory structure and filenaming conventions. One possible organization includes placing all the configuration files on a single computer disk.

The configuration file may be stored on a computer disk with the configuration utility. Generally, the configuration file contains statements or configuration data written in a description language that is part of a standard or specification used to describe resource requirements of a system device. For example, a computer system may include an EISA bus or a Peripheral Component Interconnect (PCI) bus that has a corresponding standard specification which includes a description language used to identify and describe, in configuration files, the resource requirements for system devices using that particular bus.

Configuration files in a preferred organization on a single disk are generally be divided into one or more categories. The number and type of categories may vary with the actual configuration files, as will be described below. One organization includes two categories, "common" and "platform specific". A second preferred organization includes the categories "operating system specific", and "common".

"Common" configuration files are industry standard files typically supplied by a computer vendor that have not been modified for any specific operating system. "Operating system specific" configuration files are common configuration files which have been modified in accordance with particular operating system constraints. "Platform specific" configuration files are common configuration files which have been modified for a particular hardware platform or system model, such as Digital Equipment Corporation's Venturis 575 computer system or AlphaStation 250 computer system incorporating Digital's Alpha architecture. Additional categories are possible, such as a category which combines both a computer platform and a particular operating system. For example, system device "123" may be supported by a computer vendor on the OpenVMS Operating System and Windows NT Operating System on hardware platforms "plat1" and "plat2". If the configuration file is different for each combination of operating system and platform, a computer system vendor may provide four different configuration files for each device, thereby having four categories, each category representing a platform and operating system combination.

The organization of the categories may be reflected in the file naming convention and directory structure in many different ways, such as a hierarchical directory structure and a flat directory structure. Generally, a hierarchical directory structure comprises multiple levels of directories and subdirectories whose organization inherently represents a hierarchy or grouping. Opposing the hierarchical structure is the flat directory structure typically comprising one directory at a single level. Using a hierarchical directory structure, each directory may contain all files of a particular category further organized into multiple subdirectories, such as operating system specific files or platform specific files. A flat directory structure may also be used in which all files comprising a category include a predefined prefix string and are placed in a single directory. The flat directory structure generally embeds the file organization in the filename rather than in a hierarchical directory structure. For example, in a flat directory structure, a configuration file name for the Windows NT operating system begins with the prefix string "NT". Also, a configuration file name for "common" configuration files begins with the prefix string "!". Both the common and operating system specific configuration files are placed in a single directory in a flat directory structure organization. However, in a hierarchical directory structure, for example, a separate directory includes Windows NT operating system designated configuration files and another directory includes the common configuration files. Also, a combination of the flat and the hierarchical directory structures and file naming conventions may be used depending on the particular file system and its corresponding restrictions.

Information regarding the structure of the foregoing file organization is generally embedded in the configuration utility and underlying system software. More particularly, in steps 40, 42, and 44 of FIG. 3 the configuration utility and underlying system software work harmoniously to locate and retrieve the needed configuration files in the file organization. A preferred implementation minimizes modifications and dependencies on the configuration utility by partitioning, for example, those tasks subject to frequent modifications to the underlying system software.

Referring to 40, 42, and 44 of FIG. 3, the particular steps performed by the underlying system software and the configuration utility, and the particular string identifier communicated from the underlying system software to the configuration utility will be discussed in greater detail below.

Referring to step 40 of FIG. 3, generally the underlying system software performs a string computation producing the string identifier used by the configuration utility to formulate a filename for a configuration file using one or more inputs or parameters. Functionally, the input values parameterize criteria by which consumed system resources vary. Both type and number of the inputs used by the underlying system software to produce the string identifier may vary depending on the task partitioning between the underlying system software and the configuration utility for a particular implementation embodying the invention. Typically, the underlying system software obtains one or more input values using the information stored in non-volatile memory. For a first example, if a computer system vendor only supports one computer platform or model, the underlying system software may produce a string identifier that only varies with operating system. The underlying system software may have only one input value, the operating system type previously saved in non-volatile memory. Alternatively, in a second example, if a computer system vendor supports multiple computer platforms or models, the underlying system software may produce the string identifier using two or more input values. These input values may include operating system type and the platform or model number of the computer system being configured. The underlying system software may read both input values from the non-volatile memory accordingly producing a string identifier including these input values. In a third example, if a computer vendor supports multiple platforms, the underlying system software may use only one input parameter value for the operating system type and allocate the task of encoding the particular platform in the filename to the configuration utility. The optimal allocation of tasks between the configuration utility and the underlying system software may vary with each implementation depending on, for example, the configuration utility, the computer system, and its vendor. However, the configuration utility and the underlying system software functionally complement each other.

The underlying system software may obtain input values from more than one source and the form of the information may vary. As previously described, for example, the underlying system software obtains an input value, such as the particular operating system, from non-volatile memory. Each string in a predefined set of alphanumeric or alphabetic strings identifies a corresponding operating system similar to the prefix string, such as "VMS" identifying the OpenVMS Operating System, as previously described in file organization and naming conventions.

The string identifier at step 40 may be communicated to the configuration utility from the underlying system software using an application programming interface (API). Generally, an API is an interface which corresponds to a called routine. The API is used by a calling routine to invoke the called routine and communicate data in input and output parameters between the called and calling routines as needed. In the instant example, the called routine corresponds to a routine in the underlying system software that is invoked by the configuration utility. The data communicated includes an output parameter corresponding to the string identifier transmitted from the underlying system software to the configuration utility to identify, for example, the particular operating system. For example, the output parameter received by the configuration utility may be the string identifier identifying the operating system.

The configuration utility uses the string identifier to construct 42 a configuration filename for each device. As previously described, step 42 usually includes the configuration utility using a unique system identifier to construct a system resources configuration filename and using a device identifier to construct a device configuration filename.

Figure 4:
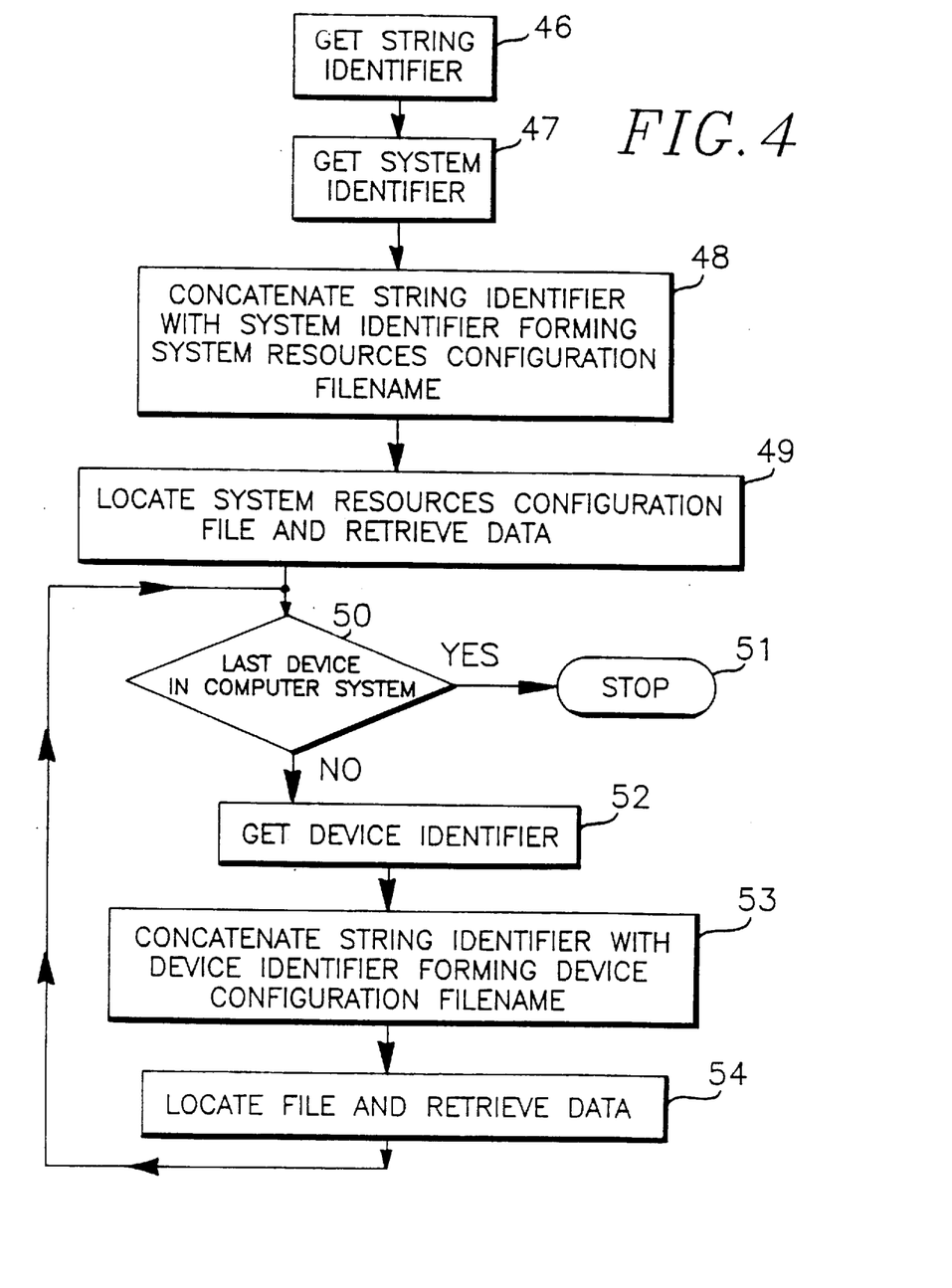
FIG. 4 is a flowchart outlining steps for constructing a configuration filename.

Referring now to FIG. 4, one method for constructing the foregoing resource and device configuration filenames of step 42 is depicted. The configuration utility receives (at step 46) the string identifier, for example, from the underlying system software as a routine return value or output parameter. The configuration utility gets (at step 47) the system identifier identifying the computer system from, for example, the CPU board. The string identifier is concatenated (at step 48) with the system identifier corresponding to the particular computer system to construct the system resource configuration filename. The system resource configuration file is located (at step 49) and its data retrieved. The configuration utility constructs a file name and locates the corresponding configuration file for each device in the computer system. A test is performed (at step 50) to determine if all needed configuration files have been retrieved. If so, the utility stops (at step 51). Otherwise, the configuration utility retrieves a device identifier (at step 52) and the string identifier returned from the underlying system software is concatenated (at step 53) with the device identifier to form a device configuration filename. The device configuration data file is located (at step 54) and its contents read by the configuration utility. The loop that includes steps 50–54 is performed for each device in the computer system.

For example, a graphics board is a system device 14 in the computer system 10. Its unique identifier specifies the manufacturer and model number of the graphics board. The configuration utility retrieves the graphics board identifier, maps it to a filename identifying the corresponding configuration file, and retrieves the contents of the corresponding configuration file describing the resource requirements of the graphics board. The graphics board or card may require one (1) megabyte of system memory that begins on a particular address boundary, as described in the configuration file.

Other methods or variations for constructing the configuration filename are possible. The configuration utility may perform the steps of FIG. 4 in a different order, for example, by performing steps 48 and 49 after performing the loop of steps 50–54. As a variation to steps 48 and 53, another embodiment may form a final string for a configuration filename using additional input strings besides the system identifier and the device identifier. For example, the configuration utility may concatenate a string suffix for the file extension, such as ".CFG". The string suffix may vary with, for example, operating system. The configuration utility may map a particular operating system as designated by an output parameter from the underlying system software, to a corresponding file extension. In another example, at step 53, a final string for the configuration filename is formed by concatenating:

i) a first string representing the file identifier as supplied by the underlying system software;
ii) a second string representing a model number for the particular computer system; and
iii) a ".CFG" file extension.

The second string may be determined by the configuration utility. The second string may also be determined by the underlying system software and passed as another output parameter of a procedure call to the configuration utility.

Typically, the configuration files describing system resources for a particular computer system and the configuration files for system devices co-exist on the same computer disk.

Figure 5:
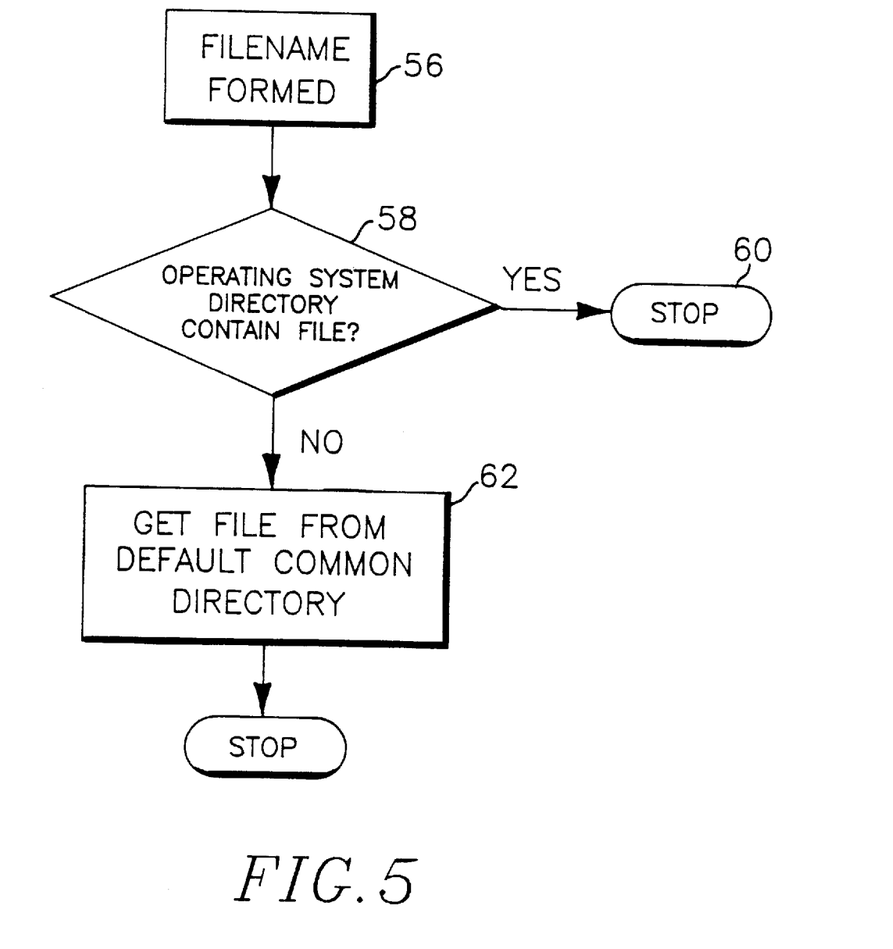
FIG. 5 is a flowchart outlining steps for locating a configuration file.

The configuration utility employs a method at steps 49 and 54 for locating the configuration file. Referring now to FIG. 5, one method for locating a configuration file in a hierarchical directory structure arrangement is depicted. Specifically, the directory structure includes an operating system specific subdirectory and a common subdirectory at the same level. The configuration filename is formed (at step 56). The configuration utility may search for a device's configuration file for a particular operating system by first attempting to locate the configuration file in the appropriate operating system specific directory (at step 58). If the configuration file is found, the search stops (at step 60) and the contents of the file are read. If no file is found, the configuration utility may default to retrieving the configuration file in the common directory (at step 62).

A configuration utility may not employ any particular algorithm if the string identifier returned by the underlying system software contains a complete filename and directory specification for the particular computer system and operating system. In a hierarchical directory structure, the configuration utility may search for the configuration file in a set of directories in a predetermined order typically referred to as a search order. The search order may be communicated to the configuration utility, for example, from the underlying system software as an output parameter. The search order may also be fixed and encoded within the logic of the configuration utility.

A particular search order designation may apply to both hierarchical directory and flat directory organizations. For example, in a hierarchical directory arrangement, the search order may designate particular directory and subdirectory paths to be search in a predetermined order to locate a particular configuration file. However, in a flat directory arrangement, such as a single directory, the search order may specify a portion of a filename, such as a subsequent string prefix, to be used to formulate an alternate filename. For example, for device "123" with a flat directory structure in a computer system with the OpenVMS operating system and multiple hardware platforms, the configuration utility may search for file "VplatX123.CFG" in which the "V" prefix designates an OpenVMS configuration file, and "platx" designates a particular Alpha hardware platform. If no such file is found, the search order may specify that the next file to search for is "Va123.CFG", designating an OpenVMS Alpha configuration file but not for a particular Alpha hardware platform. Lastly, if "Va123.CFG" is not found, the search order may specify to retrieve a default unmodified industry standard configuration file "123.CFG".

Parameters in one or more API may transmit information, including the string identifier and search path, from the underlying system software to the configuration utility. For example, the following API represented in a pseudocode notation transmits the string identifier to the configuration utility when placed as a procedure call in the configuration utility with the routine "call_underlying_system_software_api_ONE" included in the underlying system software.

call_underlying_system_software_api_ONE (char *string_identifier)

The parameter "string_identifier" is a character string, as used in step 48 of FIG. 4, to form the system resource configuration filename. As previously mentioned, "string_identifier" may include alphanumeric characters specifying a particular operating system executing in the computer system.

A subsequent call to the following API transmits the search path to the configuration utility:

call_underlying_system_software_api_TWO (integer
  num_search; char *search_path[])

The parameter "num_search" is an integer numeric value identifying the number of elements in the string array "search_path" which is an ordered list of strings. Each element in the list is a string representing a successive location, such as a directory in a hierarchical configuration file organization, in which the configuration utility attempts to locate the correct configuration data file. "num_search" is typically used by the configuration utility during a search for the configuration file. For example, in a hierarchical configuration file directory structure, if the parameter "search_path" has three string elements as follows: "PLAT1", "OS1" and "COMMON", "num_search" is 3. Each element of the "search_path" array identifies the name of a directory to search for the configuration data file. In the following example, "search_path" is a zero-based array comprising an integer number of 'N' elements, as denoted by "num_search", designated as elements "search_path[0]", "search_path[1]", "search_path[N–1]". The configuration utility may execute an algorithm as follows using the parameter values returned by the two foregoing APIs to locate the system resource configuration file:

```
/*
 * Formulate filename
 */
filename = concatenate(string_identifier,
            system_identifier,
            ".CFG");
/*
 * Initialize loop variable counter "index", and
 * boolean variable "file found"
 */
index = 0;
file_found = FALSE;
/*
 * loop through the search path array concatenating
 * different directories specified in "search_path" as
 * the prefix to the filename
 */
while ((index < num_search) AND (file_found == FALSE))
{
    temp_filename = concatenate (search_path[index],
                    filename);
    /*
     * if file exists, stop search and file found
     */
    if(temp_filename) exists then
        file found = TRUE;
    else
    /*
     * Examine next directory
     */
        index = index + 1;
}
/*
 * error condition if no file found and each directory
 * searched
 */
If ((index == num_search) AND (file found == FALSE))
    handle error condition
```

Other embodiments of the invention may include variations of the previous APIs. For example, an implementation may use only a single API to transmit needed information to the configuration utility.

The foregoing technique and examples used to formulate a device configuration filename, and locate the device configuration file may also be employed in a preferred embodiment to formulate a system resource filename and locate the corresponding system resource configuration file.

There are a variety of ways to specify a search order to the configuration utility in a preferred implementation embodying the invention. The optimal method may depend on the underlying directory structure and file organization.

An advantage of embedding any of the foregoing methods or information in the underlying system software rather than the configuration utility allows the computer system vendor freedom to, for example, modify the file organization, or add files to the existing file structure without requiring changes in the configuration utility typically owned and maintained by an outside independent vendor as previously described.

Another advantage afforded by the invention is the great flexibility provided to computer system vendors to partition complementary tasks between the configuration utility and underlying system software. Using the foregoing invention decreases the overall cost incurred by a computer system vendor and increases customer satisfaction.

An advantage provided by the invention to the purchaser of a computer system is the ease and efficiency in initial configuration and reconfiguration of a computer system.

Figure 6:
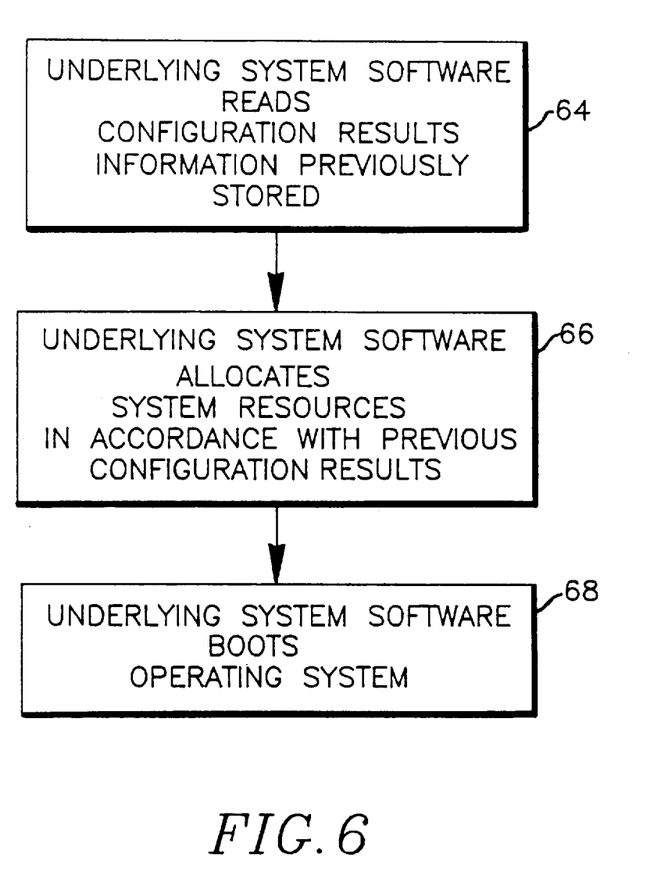
FIG. 6 is a flowchart depicting steps performed during rebooting of a computer system.

Referring now to FIG. 6, a flowchart sets forth steps that may be performed during rebooting a computer system after the initial configuration embodying the invention is performed. The underlying system software reads 64 the configuration information results previously stored by the configuration program or the underlying system software in non-volatile memory. The underlying system software then allocates the computer system resources in accordance with the configuration information results incorporating the operating system constraints. The underlying system software proceeds to booting 68 the operating system.

Although the foregoing preferred implementation discloses a particular complementary division of function between the configuration utility and the underlying system software, different complementary divisions are possible in other preferred implementations embodying the invention.

Prior art techniques include using manual data entry to incorporate operating system constraints, or relied upon the configuration utility vendor to incorporate the ongoing support required by the computer system vendor. A preferred implementation embodying the invention automates computer system configuration by minimizing the amount of required user interaction and specifically by reducing the manual data entry. The amount of external dependencies are limited so that the computer vendor retains control over the mechanism, the underlying system software, by which she may add or modify support for additional hardware devices is provided. This results in reduced costs, and increased product quality and reliability.

The foregoing technique affords a flexible and efficient way of performing an automated configuration of a computer system in a cost and time efficient manner. Additionally, a preferred implementation accomplishes this without adversely affecting the reliability and quality of a computer system and its ability to correctly and efficiently use supported devices. A preferred implementation embodying the invention neither impedes the computer system vendor's ability to add support for new devices or operating systems, nor her ability to provide corrections for presently supported devices.

Having described preferred embodiments of the invention, it will now become apparent to those of skill in the art that other embodiments incorporating its concepts may be provided. It is felt therefore that this invention should not be limited to the disclosed embodiments but rather should be limited only by the spirit and scope of the appended claims.

What is claimed is:

1. A memory included in a computer system, the memory comprising:

a file identifier generator that produces a file identifier corresponding to a configuration file using one or more input parameter values comprising a portion of computer system specific information; and a configuration utility, responsive to said file identifier generator, for configuring said computer system by performing resource allocation, said configuration utility further including:
  a filename constructing generator, responsive to said file identifier generator, for producing a filename using said file identifier and corresponding to a configuration file comprising configuration data used to configure said computer system.

2. The memory of claim 1, wherein said computer system includes a bus to be configured and at least one system resource to be allocated for use by at least one system device on said bus, and the memory further comprising:
  one or more configuration files containing configuration data, at least one of said configuration files corresponding to a system device used in said computer system, at least one of said configuration files is a system resource file describing the system resources available in said computer system.

3. The memory of claim 2, wherein said configuration data comprising said configuration files is customized corresponding to said computer system.

4. The memory of claim 3, wherein said computer system specific information includes an operating system type representing an operating system that executes in said computer system, and wherein said input parameter values comprising a portion of said computer system specific information including said operating system type.

5. The memory of claim 4, wherein said configuration data is customized in accordance with said operating system type.

6. The memory of claim 4, wherein one of said system resource files corresponds to said operating system that executes in said computer system.

7. The memory of claim 4, wherein said configuration files are organized in a flat directory structure, said configuration files having a filenaming convention including a first prefix string corresponding to said operating system, a second prefix string corresponding to another different operating system that executes in said computer system, a third prefix string corresponding to a first hardware platform, and a fourth prefix string corresponding to industry standard configuration files not customized for a particular computer system or operating system.

8. The memory of claim 4, wherein one of said input parameter values describes said operating system.

9. The memory of claim 2, wherein said configuration files are organized in a hierarchical directory structure including a first directory corresponding to an operating system that executes in said computer system, a second directory corresponding to a hardware platform, and wherein said first directory comprises at least one configuration file customized for said operating system, and said second directory comprises at least one configuration file customized for said hardware platform.

10. The memory of claim 2, wherein said configuration files are organized in a hierarchical directory structure of configuration data files including a common directory corresponding to industry standard files containing generic configuration data that is not customized for a particular operating system or hardware platform of a computer system.

11. The memory of claim 2, wherein said configuration data comprising said configuration files is customized in accordance with one or more hardware platforms that may comprise said computer system.

12. The memory of claim 2, wherein said configuration file corresponds to one of said system devices, said configuration file including configuration data specifying allocation requirements for a corresponding system device.

13. The memory of claim 2, wherein said filename constructing means produces a filename corresponding to said system resource file describing system resources available for allocation in said computer system.

14. The memory of claim 1, wherein one of said input values describes a hardware platform of said computer system.

15. The memory of claim 1, wherein said computer system includes a read-only memory and said file identifier generator comprises underlying system software stored in said read-only memory.

16. The memory of claim 1, wherein said configuration utility includes a configuration result generator for producing configuration result information describing the resource allocation in said computer system, said configuration result information being stored in said memory, and said memory further includes a rebooting information retriever for retrieving said configuration result information from said memory and then rebooting said computer system.

17. The memory of claim 1 further comprising an interface for communication used by said file identifier generator to communicate said file identifier to said filename constructing generator.

18. The memory of claim 1 further including a search path generator for generating and transmitting to said configuration utility a search path identifying a predetermined search order used by said configuration utility to locate said configuration file.

19. The memory of claim 18, wherein said search path identifies directories in a hierarchical directory structure including an operating system directory comprising a configuration data file customized for a particular operating system, a hardware platform directory comprising a configuration data file customized for a particular hardware platform, and a common directory comprising an uncustomized configuration data file.

20. The memory of claim 18, wherein said search path identifies files in a flat directory structure including an operating system file comprising configuration data customized for a particular operating system, a hardware platform file comprising configuration data customized for a particular hardware platform, and a common file comprising uncustomized configuration data.

21. The memory of claim 1, wherein said file identifier is a string and wherein said filename constructing generator concatenates said string with another string producing said filename corresponding to said configuration file.

22. The memory of claim 21, wherein said string identifies an operating system that executes in said computer system.

23. The memory of claim 2, wherein said configuration file is a system resource configuration file describing said system resources in said computer system, and the memory further includes:
  a device configuration filename constructor for constructing a device configuration filename using said file identifier and a device identifier uniquely identifying a system device, said device configuration filename corresponding to a device configuration file comprising allocation requirements for a system device;
  a configuration data retriever for retrieving configuration data from said device configuration files and said system resource configuration file; and
  a system resource allocator for allocating said system resources to said system devices in accordance with said configuration data producing configuration results describing the system resource allocation.

* * * * *